Sept. 4, 1951     A. RUCH     2,567,125
FRICTION CLUTCH MECHANISM

Filed Dec. 30, 1948     3 Sheets-Sheet 1

INVENTOR.
Arthur Ruch
BY Harvey M. Gillespie
Atty.

Sept. 4, 1951  A. RUCH  2,567,125
FRICTION CLUTCH MECHANISM
Filed Dec. 30, 1948  3 Sheets-Sheet 3
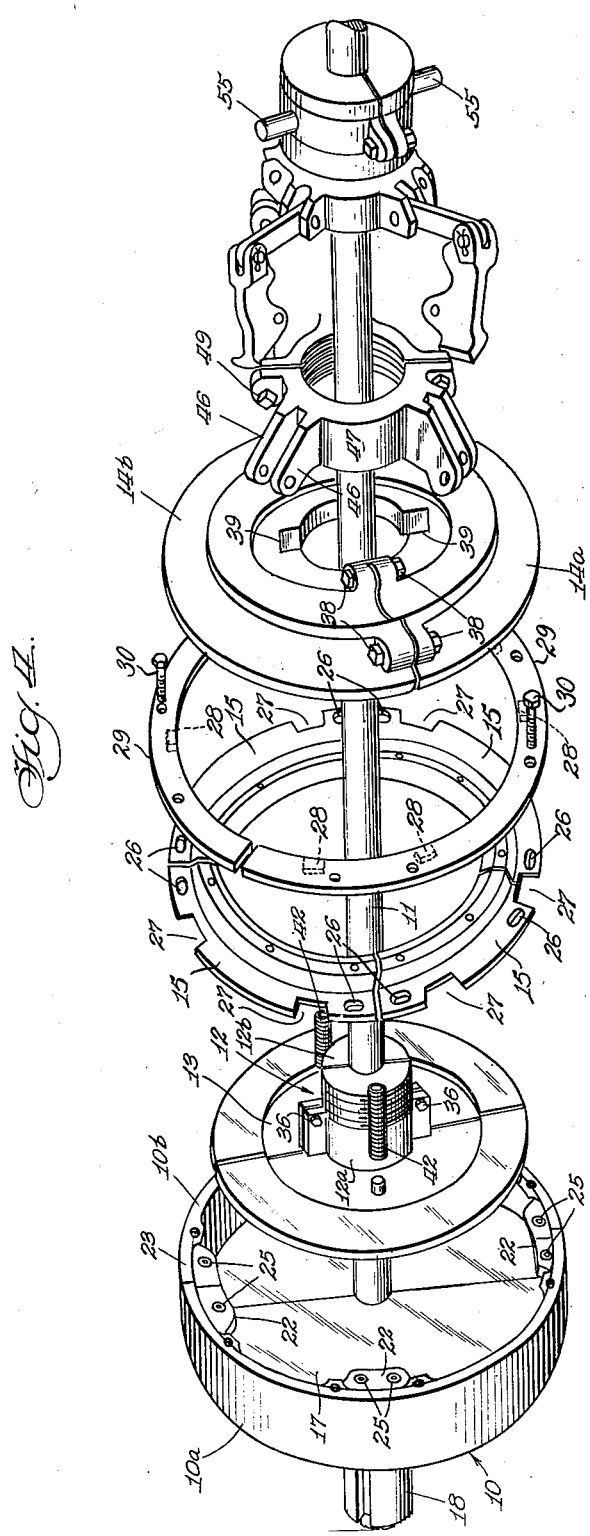
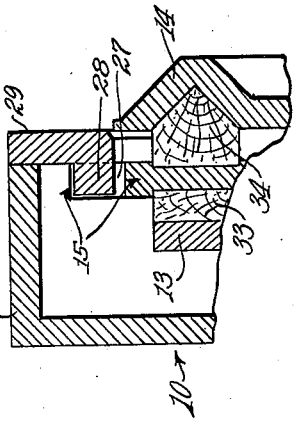
INVENTOR.
Arthur Ruch
BY
Harvey M. Gillespie
Atty.

Patented Sept. 4, 1951

2,567,125

UNITED STATES PATENT OFFICE 2,567,125

FRICTION CLUTCH MECHANISM

Arthur Ruch, Chicago, Ill.

Application December 30, 1948, Serial No. 68,209

5 Claims. (Cl. 192—55)

This invention relates to improvements in friction clutches of the general class used in industrial plants to transmit power from a continuously operable power shaft.

Clutches of the above general class ordinarily comprise a power take-off member journaled on the power shaft and permitting independent movement of the shaft, a member fixed to the shaft so as to rotate continuously therewith, and means for releasably connecting said members together by friction, whereby the power take-off member is releasably clutched to the power shaft. Heretofore, the releasable connection of the power take-off member with the cooperating clutch member fixed to the shaft has comprised a clamping engagement of such character that both said members, when frictionally clutched together, must necessarily rotate about the same axis. This condition makes frequent repairs necessary since the journal opening of power take-off members must be bushed or re-lined from time to time to compensate for wear. Otherwise, the axis of the power take-off member assumes a position eccentric to the axis of the power shaft, such as shown in Fig. 6 of this application. Under such condition a rigid clamping of the power take-off member to the driving member of the clutch, while the power take-off member is eccentric to the axis of the power shaft, creates an unbalanced condition. That is to say, the eccentric position of the take-off member, being clutched rigidly to the driving member of the clutch, throws a major portion of the weight of the power take-off member to one side of its axis of rotation. Such unbalanced condition of the rotating members sets up severe vibration which not only tends to injure the journal bearings of the power shaft, but imposes severe pulsating and twisting strains on the clutch mechanism itself.

A principal object of the present invention is to provide an improved friction clutch structure of the above general class which will avoid the above unbalanced condition even though the journal opening of the power take-off member may be substantially larger than the power shaft or other journal on which it is rotatably mounted.

Another object of the invention is to provide a friction clutch of the above character which will not require frequent repair to bring the rotating parts into axial alignment.

According to the present invention, provision is made for yieldably connecting the power take-off member with the frictional driving member of the structure, whereby the power take-off member and the said frictional driving member may rotate about different axes without creating an unbalanced condition. This result is accomplished, in the improved structure herein disclosed, by connecting means in the form of a plurality of friction ring segments yieldably mounted on the power take-off member so as to have capacity for limited sliding movement, transversely of the power shaft, relative to the main body of the power take-off member. The said friction ring segments are provided with wedge-shaped friction faces which serve as cams, during preliminary engagement with correspondingly inclined faces of a pressure exerting clutch plate, so that the rotational axis of the segments, as a group, is moved into alignment with the rotational axis of the clutch plate and the shaft when the said clutch plate is moved lengthwise of the power shaft into frictional gripping engagement with the segments. The provision for limited sliding movement between the friction segments and the main body of the power take-off member serves to compensate for any substantial non-axial alignment of the power take-off member with the power shaft. Consequently, the power take-off member and the power shaft may rotate about different axes without producing an objectionable unbalanced condition.

The invention is illustrated, in certain preferred embodiments, in the accompanying drawings wherein:

Fig. 4 is an exploded view of the clutch structure showing in perspective the several parts thereof.

Fig. 5 is a fragmentary cross-section taken through the clutch structure on line 5—5 of Fig. 3, and Fig. 6 is a fragmentary sectional view taken through the hub structure of a power take-off member of the clutch and illustrating the journal opening of the power take-off member substantially larger than the power shaft, on which it is journaled.

Figure 1:
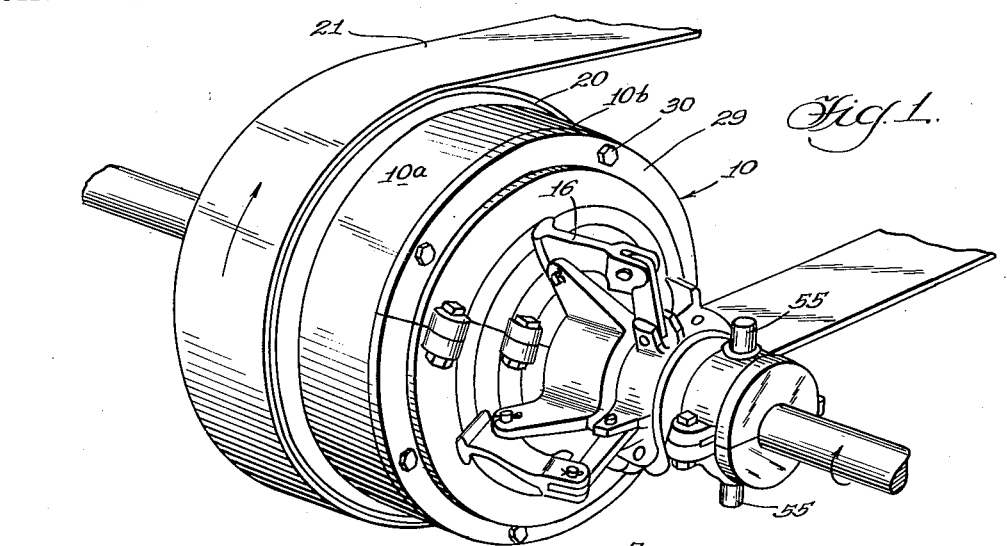
Fig. 1 is a view in perspective of a friction clutch constructed in accordance with this invention.
Figure 3:
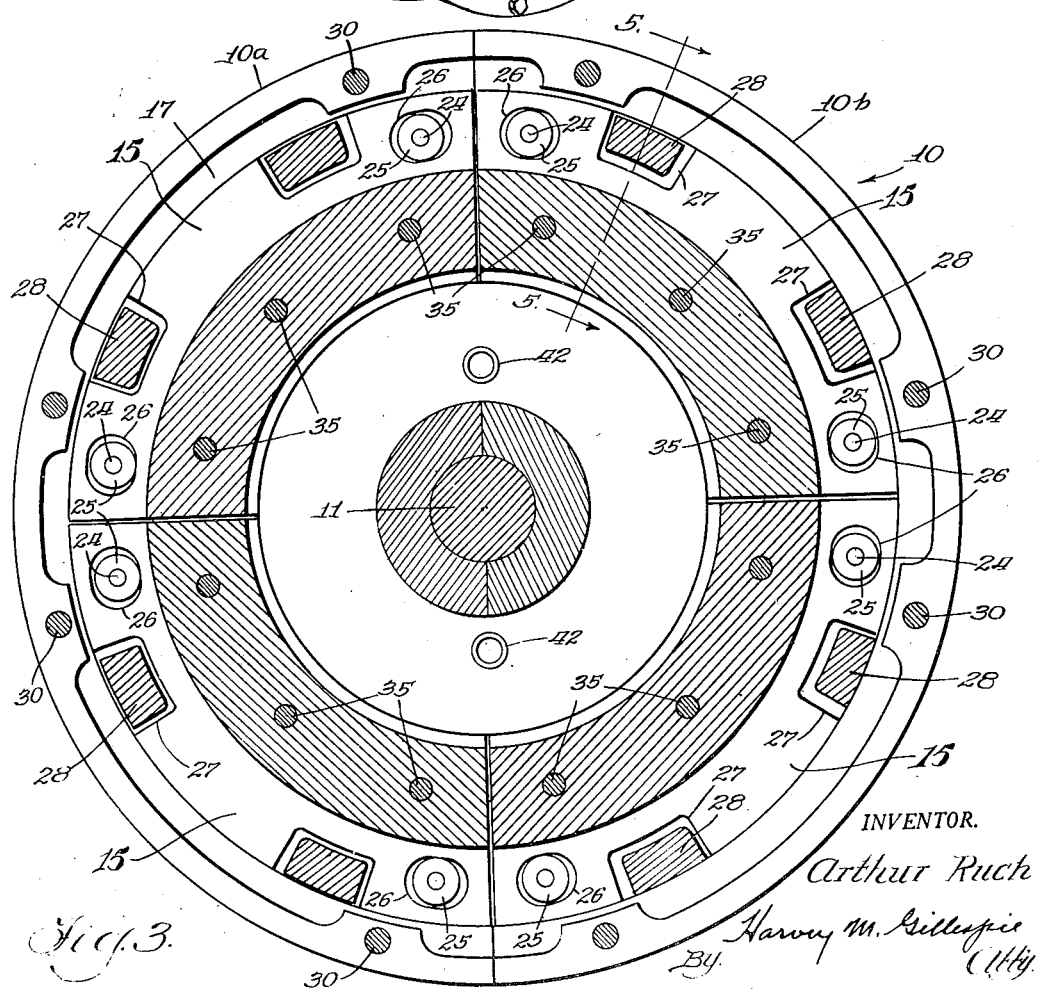
Fig. 3 is a transverse sectional view taken on line 3—3 of Fig. 2 and looking in the direction of the arrows.

The clutch mechanism herein shown may be described briefly as comprising a power take-off member 10 journaled on a power shaft 11, a clutch sleeve 12 provided with an abutment friction disk 13 and secured to the power shaft so as to rotate therewith, a pressure actuated clutch plate 14 carried by the clutch sleeve 12, a plurality of friction elements 15 in the form of separate segments of a ring, which segments are yieldably mounted on the power take-off member and projects between the abutment disk 13 of the said sleeve 12 and the pressure actuated clutch plate 14, and toggle lever means, designated generally by the reference numeral 16, for moving the clutch plate 14 lengthwise of the sleeve 12 into engagement with the segments 15, whereby the opposite faces of the said segments 15 are frictionally clamped between the said abutment disk 13 and the said clutch plate.

All of the clutch elements are designed for application to a power shaft intermediate its ends. Consequently, the several elements of the clutch structure are split into two complementary sections, whereby they may be fittted to a shaft at any desired location. To this end, the power take-off member 10, comprising a hollow housing portion 17 and a hub portion 18, is formed in two sections 10ᵃ—10ᵇ so as to facilitate mounting the sections on the power shaft 11. The two parts 10ᵃ—10ᵇ, after being assembled to rotate about the shaft 11, are secured together by bolts 19. A pulley 20 for a power transmitting belt 21 is keyed or otherwise suitably secured to the hub portion 18 of the power take-off member.

The hollow housing portion 17 of the power take-off member is of circular configuration and the inner face of its perimtter is formed with a plurality of bosses 22 which stop short of the outer edge 23 of the housing. A plurality of studs 24 are threaded into the said bosses and extend outwardly therefrom to provide pintle supports for a plurality of resilient buffers 25 in the form of rollers. Each segment element 15 is provided with two elongated openings 26—26 spaced apart and fitting over a pair of the resilient buffers 25. The radial diameter of the elongated openings 26 preferably correspond to the diameter of the resilient buffers 25 so that the segment elements 15 are each supported by the resilient buffers and, therefore, by virtue of the resilience of the buffers, have capacity for movement relative to each other and relative to the housing portion 17 of the power take-off member 10. Each of the said segment elements is formed, in its outer periphery, with a pair of open recesses 27—27 which embrace a pair of inwardly projecting lugs 28—28 formed on the inner face of a ring 29; the latter being split into two parts 29ᵃ—29ᵇ and bolted to the edge 23 of the housing 17 by means of bolts 30. The inner portions of the segment elements 15 are formed on their opposite faces with arcuate channels 31 and 32 adapted to receive wooden blocks 33 and 34, respectively, which provide renewable friction surfaces for the several segment elements. Each block 33 is of rectangular configuration in cross-section and is fitted in a channel 31 of a segment element. Each block 34 is of V-shape in cross-section and is fitted into the channels 32 of a segment element. The blocks 33—34 are firmly secured in position by means of rivets 35 which extend through both blocks and the segment element on which they are mounted.

It will be seen from the above construction of the segment elements 15 and the manner in which they movably engage the lugs 28—28 of the rings 29, that each segment 15, by virtue of the resilient buffer 25 and the elongated slot 26 may move independently of the others and may move in a direction lengthwise of the elongated slots 26 to bring a vertical edge of a recess 27 into abutting engagement with a side face of a cooperating lug 28 on the ring 29. It will also be observed that the resilience of the buffers 25 will permit radial sliding movement between the co-engaging abutting surfaces of the said recesses 27 and the lugs 28, whereby the segment elements may be moved toward the axis of the power shaft without disturbing the position of the power take-off member.

Figure 2:
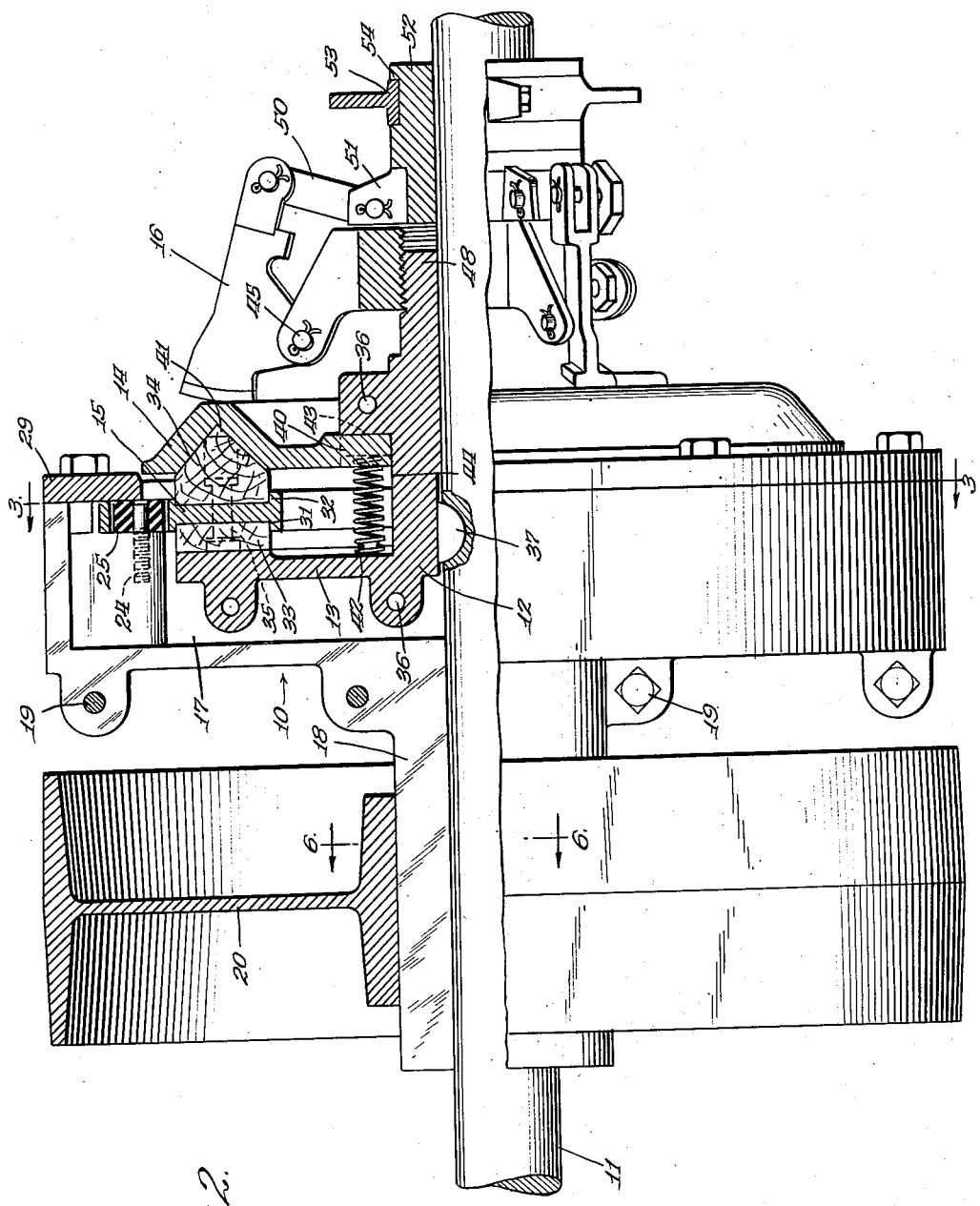
Fig. 2 is a view partly in elevation and partly in longitudinal section of the clutch shown in Fig. 1.

The friction sleeve 12 is split into two parts 12ᵃ and 12ᵇ and secured together by means of bolts 36 so that it may be applied to and removed from the power shaft at any desired location intermediate the ends of the shaft. The sleeve is secured to the shaft 11 by means of a key 37 (Fig. 2) and includes a disk portion 13 which serves as a frictional abutment for the inner faces of the segment elements 15 when the plate 14 is pressed into gripping contact with the opposite faces thereof. The pressure actuated friction plate 14 is made in semi-circular sections 14ᵃ—14ᵇ secured together by means of bolts 38. Each section of this plate is formed with a slot 39—39 which fits the clamping lugs 40ᵃ—40ᵇ of the sleeve sections. The said lugs 40ᵃ—40ᵇ, therefore, serve as key members to spline the plate 14 to the sleeve 12. The said plate is movable lengthwise of the sleeve into and out of frictional clamping engagement with the V-shaped friction blocks 34 on the several segment elements 15. For this purpose the said plate is formed with a V-shaped recess 41 adapted to fit over and wedgingly engage the V-shaped configuration of the several blocks 34.

A pair of compression springs 42 are interposed between the abutment disk 13 of the sleeve 12 and the friction plate 14 so as to normally hold the friction plate 14 disengaged from the blocks 34.

The said friction sleeve 12 is preferably fixed to the shaft, and the frictional engagement between the blocks 33 and the abutment disk portion 13 of the sleeve 12 is brought about by the pressure of the plate 14 against the blocks 34. This pressure will move the power take-off member lengthwise of the power shaft to effect frictional clamping engagement of the segments 15 between the said abutment disk 13 and the pressure actuated plate 14. The amount of this will vary from time to time so as to compensate for the wear on the wooden blocks 33 and 34.

The plate 14 is moved into frictional engagement with the friction blocks 34 by means of four toggle levers 16 which press against the outer surface of the V-shaped portion 41 of the plate 14. These toggle levers are preferably pivoted at 45 between ears 46—46 formed on a collar 47. This collar is made in two parts 47ᵃ—47ᵇ which are clamped together on a threaded end portion 48 of the sleeve 12; the collar sections being secured together by means of bolts 49. The outer end of each of the toggle levers 16 is bifurcated to receive one end of a toggle link 50. The other end of the link is pivoted between ears 51—51 formed on an operating sleeve 52. This sleeve is split to form two sections 52ᵃ—52ᵇ and is slidable lengthwise of the power shaft 11. The two sections 52ᵃ—52ᵇ of the sleeve are held together by means of a strap 53 composed of sections 53ᵃ—53ᵇ which fits into a retaining channel 54 extending around the outer surface of the sleeve 52.

Each strap section 53ª—53ᵇ is provided with an outwardly projecting lug 55 adapted to engage with a suitable fork of operating lever (not shown), whereby the sleeve 52 may be moved lengthwise of the shaft to rock the toggle levers 16 in a direction to exert pressure against the plate 14. This pressure, as before indicated, forces the plate into tight wedging engagement with the inclined wedge faces of the friction block 34 and also presses the flat friction blocks 33 of the several segment elements firmly against the abutment disk portion 13 of the sleeve 12. This frictional engagement clamps the several segments 15 to the rotating sleeve 12 of the clutch, whereby the edge surfaces of the recesses 27—27 are brought into sliding engagement with the cooperating side faces of the lugs 28 of the clamp ring 29. Consequently, the rotational movement of the power shaft 11 is transmitted to the power take-off member 10 and thence to the belt 21. The said clutching pressure is released by movement of the said sleeve 52 in a direction toward the right of Fig. 2. Whereupon the springs 42 expand to force the clutch plate 14 out of rubbing engagement with the friction blocks 34.

By virtue of the fact that the segment elements 15 are yieldably supported on the resilient buffers 25, they are permitted to automatically adjust their positions to bring the inclined surfaces of the friction blocks 34 into alignment with the cooperating wedging faces of the pressure actuated plate 14, when the latter is moved lengthwise of the power shaft toward the friction blocks 34. This camming action on the inclined faces of the blocks 34 insure perfect alignment of the several segments with the V-shaped portion clutch plate 14. In the event of substantial wear of the journal opening in the hub portion 18 of the power take-off member, whereby such journal opening is larger than the power shaft, as indicated at 55ª in Fig. 6, and the power take-off member rotates about an axis 56 eccentric to the axis 57 of the power shaft, the resilience of the buffers 25 permits movement of the clutch segments 15, under the camming pressure of clutch plate 14, in a direction to bring the rotational axes of the several segments into alignment with the axis of the power shaft. The sliding engagement of the edges of the recesses 27 with the side faces of lugs 28, therefore, compensate for any eccentric, non-axial alignment of the power take-off member 10 relative to the power shaft. Consequently, the power take-off member 10 will maintain a line contact throughout the full width of its journal bearing on the power shaft. This character of engagement will prevent the forces transmitted to the belt 21 from imposing tilting strains on the power take-off member at an angle to the axis rotation of the power shaft, which angular movement, when the power take-off member is rigidly clamped to the shaft, imposes fracturing strains on the co-engaging friction members of the clutch and also creates an unbalanced or counter-weight effect on the rotating clutch mechanism as a whole.

While the invention, as herein illustrated, shows the use of four segment elements 15, it will be obvious that the number of such segments may be varied. It should also be understood that the clutch structure herein shown is intended only as an illustration and not as a limitation to the scope of the invention.

I claim:

1. In combination with a power shaft, a friction clutch structure mounted on the shaft comprising a power take-off member journaled on the shaft, a frictional driving member secured to the shaft to rotate therewith, and connecting means positioned for releasable frictional engagement with said driving member; means on the power take-off member defining an abutment element, and means defining a cooperating abutment face on said connecting means which is movable, by rotation of said connecting means relative to said power take-off member, into sliding abutting engagement with said abutment element; whereby said connecting means has a positive driving connection with said power take-off member, but is yieldable relative thereto in a direction transversely of the shaft to compensate for non-axial alignment of the power take-off member and the power shaft.

2. In combination with a power shaft, a friction clutch structure mounted on the shaft comprising a power take-off member journaled on the shaft, a frictional driving member secured to the shaft to rotate therewith, and connecting means comprising a plurality of separate elements positioned for releasable frictional engagement with said driving member, means on the power take-off member defining a plurality of abutment elements, and means defining a plurality of abutment faces on each of said separate elements for cooperating with said abutment elements on the power take-off member and movable, by rotation of said separate elements relative to said power take-off member, into sliding abutting engagement with their associated abutment elements; whereby the several separate elements of said connecting means have positive driving connections with the power take-off member, but are yieldable relative thereto in a direction transversely of the shaft to compensate for non-axial alignment of the power take-off member and the power shaft.

3. In combination with a power shaft, a friction clutch structure mounted on the shaft comprising a power take-off member journaled on the shaft, a frictional driving member secured to the shaft to rotate therewith, and connecting means comprising a plurality of ring segments positioned for releasable frictional engagement with said driving member, means on the power take-off member defining a plurality of abutment elements, and means defining a pair of recesses in each of said ring segments for embracing a pair of said abutment elements, one face of each recess being movable, by rotation of said segments relative to said power take-off member, into sliding abutting engagement with an associated abutment element; whereby said ring segments have positive driving connections with the power take-off member, but are yieldable relative thereto in a direction transversely of the shaft to compensate for non-axial alignment of the power take-off member and the power shaft.

4. In combination with a power shaft, a friction clutch structure mounted on the shaft comprising a power take-off member journaled on said shaft, a frictional driving member secured to the shaft to rotate therewith, and connecting means comprising a plurality of ring segments arranged in circular alignment for rotation about the axis of the shaft, means for moving the frictional driving means into frictional gripping engagement with said ring segments, resilient means for yieldably connecting the ring segments to the power take-off member comprising resilient buffer elements carried on the power take-off member extending into elongated openings formed in the said ring segments, lugs formed on the power take-off member providing a plurality of abutment elements, and means defining abutment faces on said ring segments for embracing said abutment elements, whereby the said segments have positive driving connections with the said power take-off, but have capacity for movement relative to said abutment members transversely of the power shaft to compensate for non-axial alignment of the power take-off member and the power shaft.

5. In combination with a power shaft, a friction clutch structure operable by said shaft and comprising a power take-off member supported for rotational movement, a friction driving element comprising a sleeve element fixed on the power shaft, and connecting means comprising a plurality of friction ring segments yieldably supported on the power take-off member and positioned for frictional engagement with said friction driving member, lug elements on the power take-off member defining a plurality of spaced apart abutments, means defining a pair of recesses formed in the periphery of each ring segment for loosely embracing a pair of said abutments and movable into abutting sliding engagement with the cooperating side walls of said abutments, whereby each of said ring segments has a positive driving connection with said power take-off member, but is yieldable relative thereto in a direction transversely of the power shaft to compensate for non-axial alignment of the power take-off member and the power shaft.

ARTHUR RUCH.

REFERENCES CITED

The following references are of record in the file of this patent:

UNITED STATES PATENTS

| Number | Name | Date |
|---|---|---|
| 797,578 | Holcomb | Aug. 22, 1905 |
| 863,864 | Master | Aug. 20, 1907 |
| 911,415 | Lemley | Feb. 2, 1909 |
| 1,584,425 | Best | May 11, 1926 |
| 2,073,852 | Radford | Mar. 16, 1937 |
| 2,167,705 | Batten | Aug. 1, 1939 |